April 22, 1969     T. R. STOCKTON     3,439,560
MANUALLY OPERABLE TRANSMISSION COIL SPRING CLUTCH
Filed Jan. 25, 1968     Sheet 2 of 3
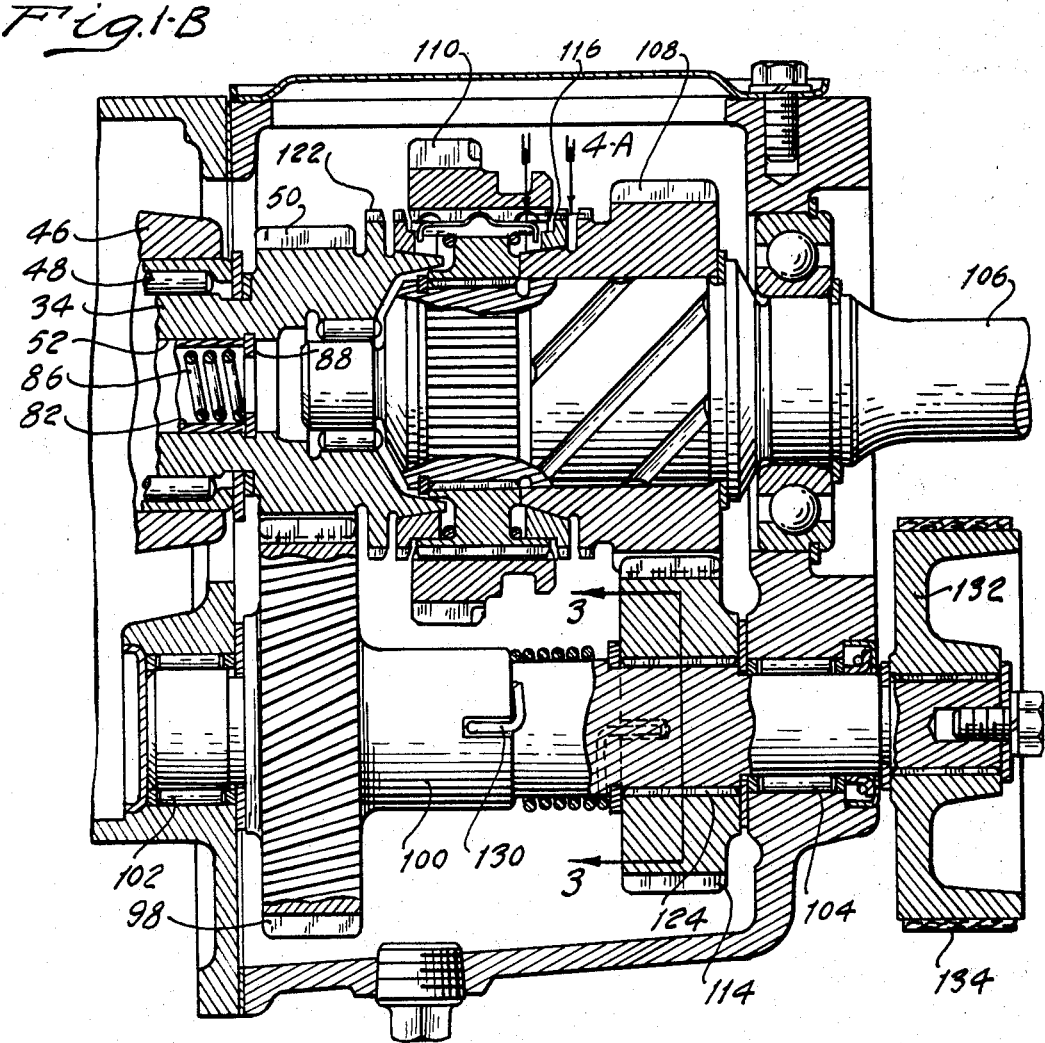
Fig.1-B
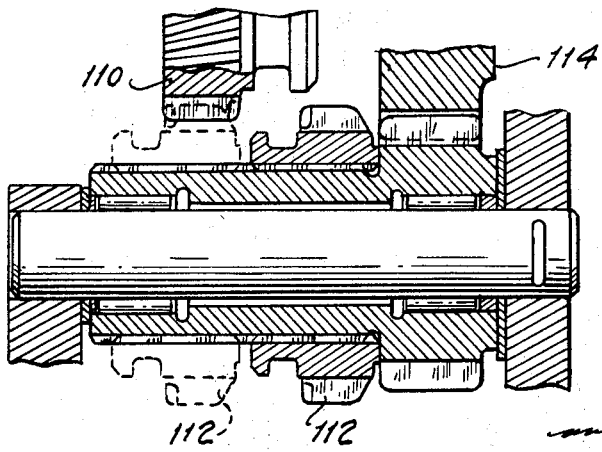
Fig.1-C
INVENTOR:
THOMAS R. STOCKTON
BY
ATTORNEYS

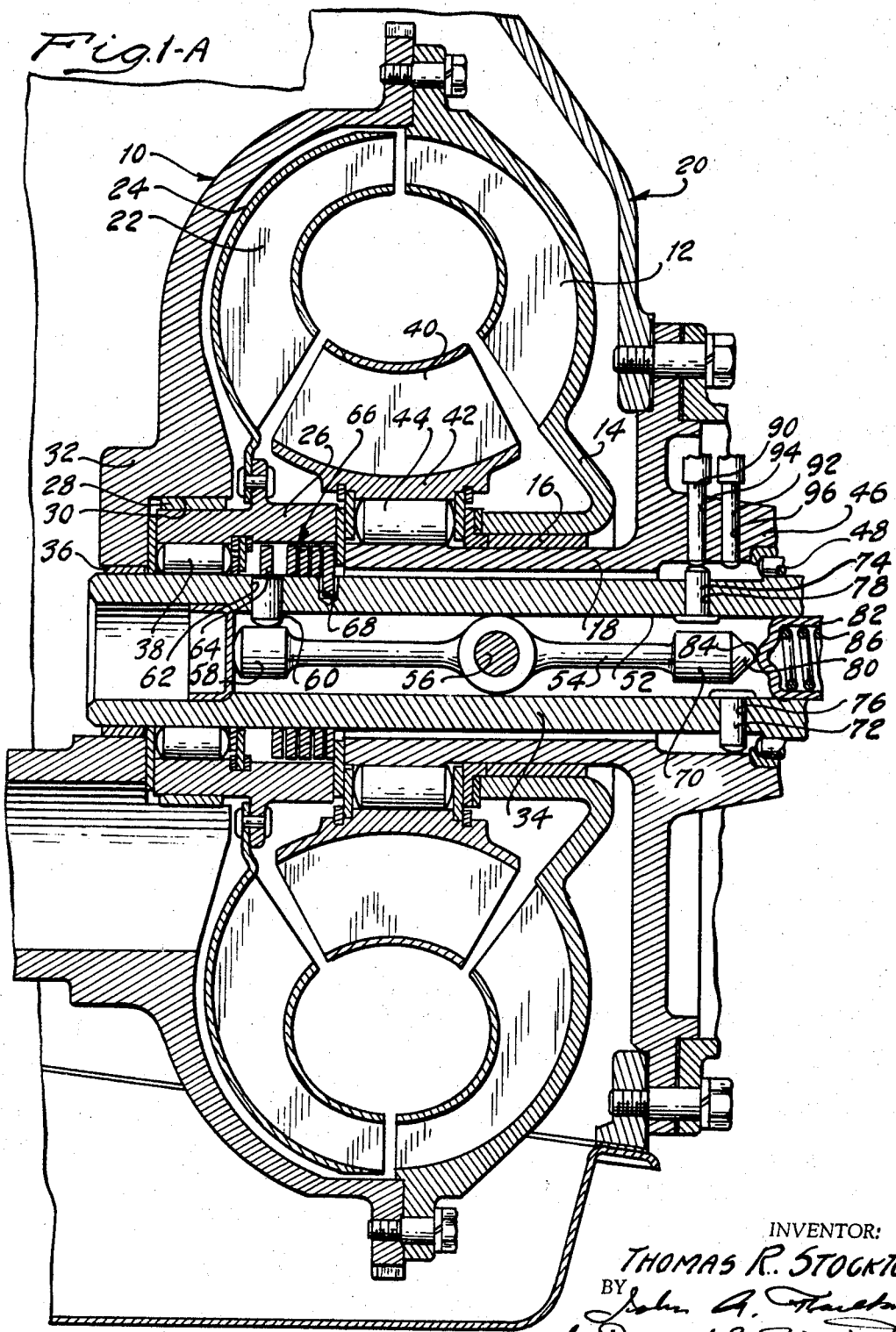

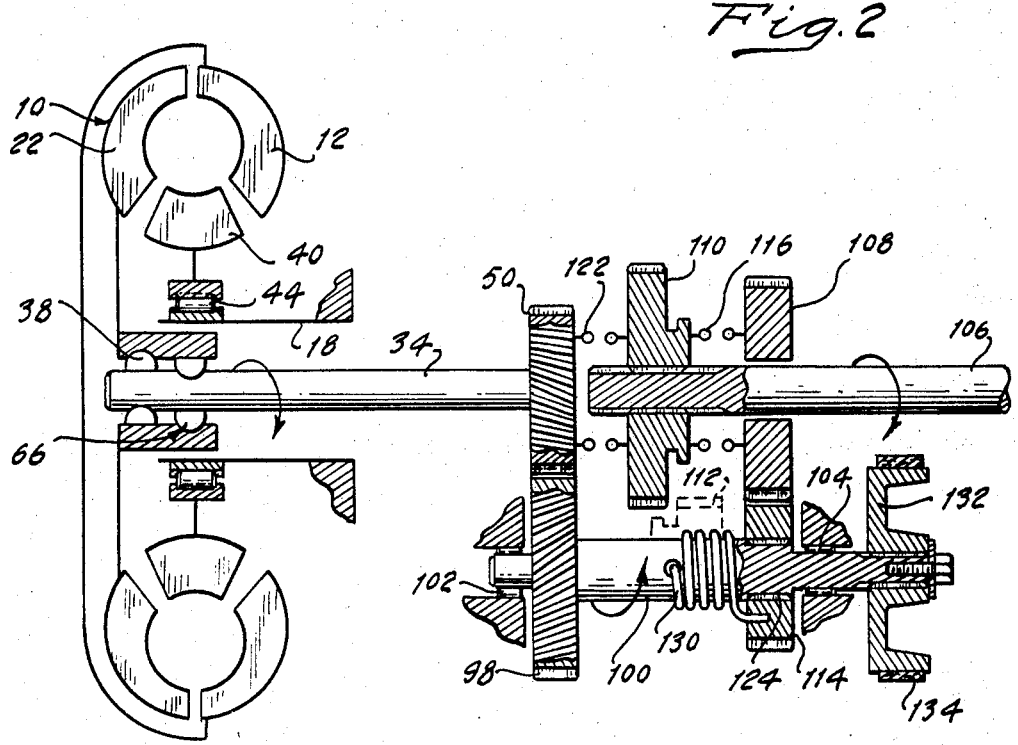
Fig. 2
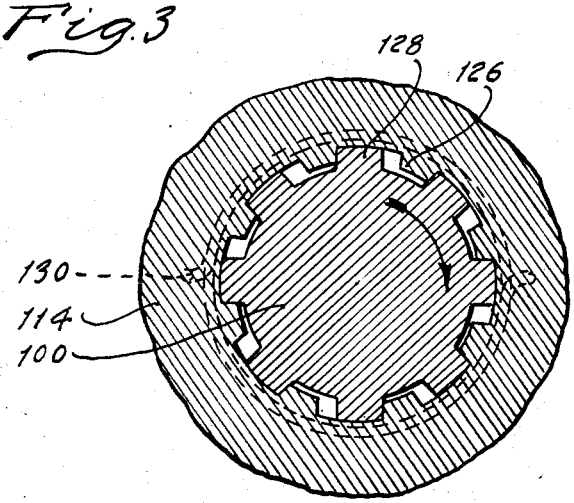
Fig. 3
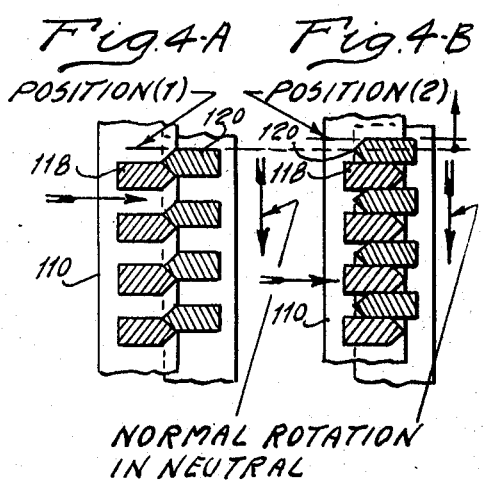
Fig. 4-A   Fig. 4-B
NORMAL ROTATION IN NEUTRAL
INVENTOR:
THOMAS R. STOCKTON
BY
ATTORNEYS.

United States Patent Office 3,439,560
Patented Apr. 22, 1969

3,439,560
MANUALLY OPERABLE TRANSMISSION COIL SPRING CLUTCH
Thomas R. Stockton, Ann Arbor, Mich., assignor to Ford Motor Company, Dearborn, Mich., a corporation of Delaware
Filed Jan. 25, 1968, Ser. No. 700,589
Int. Cl. F16h 47/06, 47/00
U.S. Cl. 74—732                            6 Claims

ABSTRACT OF THE DISCLOSURE

This specification describes a simplified, two speed-ratio, hydrokinetic, power transmission mechanism having a torque converter with a turbine drivably connected to the power input gear of a gear unit by means of a compound overrunning clutch arrangement. Engine braking through the hydrokinetic torque converter is available. The usual neutral clutch is eliminated. A spring-loaded, lost motion connection between the power output gear and an intermediate countershaft in the transmission gearing, together with a countershaft brake, will permit engagement of the low speed-ratio gearing notwithstanding the presence of torque acting on the power input gear.

General description of the invention

This invention comprises a hydrokinetic, multiple-ratio, power transmission mechanism for an automotive vehicle driveline. It includes structural features that are common to the mechanism disclosed in co-pending United States application Serial No. 690,021 filed by Robert E. Kaptur. It is adapted especially to be used in an environment of the type shown in U.S. Patent No. 3,161,015. That patent and co-pending patent application Serial No. 690,021 assigned to the assignee of this invention. Patent No. 3,161,015 discloses a compact, two speed-ratio, hydrokinetic, power transmission mechanism for use with an internal combustion engine. The torque converter of the patented construction includes an impeller that is connected to the engine flywheel directly, and a turbine that is connected to the power input gear of a two speed-ratio gearing arrangement through a selectively engageable neutral clutch.

In the improved mechanism of this invention, the neutral clutch is eliminated entirely and the turbine is connected to the power input gear through an overruning coupling so that the inertia of the rotating elements of the converter will not interfere with ratio changes in the gearing. The presence of the overrunning coupling, however, requires the use of an additional coupling arrangement during coasting if engine braking is to be obtained. This additional coupling action is obtained by means of a selectively engageable coil spring clutch situated between the turbine and the power shaft leading to the power input gear. The spring clutch can be actuated when coasting operation is desired, thereby bypassing the normal torque delivery coupling of the turbine.

Low speed-ratio operation of the gearing may be initiated following operation in neutral while the vehicle is stationery by braking the transmission countershaft. This overcomes the turbine torque acting on the power input gear due to the idling motion of the engine and he impeller.

The torque delivery gear associated with the countershaft is adapted for a limited degree of lost motion in order to permit engagement of the synchronizing clutch that connects drivably the low speed-ratio power output gear with the power output shaft. After a low speed-ratio drive is established, the countershaft brake is released and the driveline then is conditioned for torque delivery in the low speed-ratio.

Brief description of the views of the drawings

FIGS. 1A, 1B and 1C are assembly views in longitudinal cross section of the hydrokinetic portion of my improved driveline and the gearing elements with which it is used.

FIG. 2 shows in schematic form the gearing assembly of FIGS. 1B and 1C used with the torque converter shown in FIG. 1A.

FIG. 3 shows a cross sectional view taken along the plane of section line 3—3 of FIG. 1B.

FIGS. 4A and 4B are detail views of synchronizer teeth associated with the low speed-ratio gear and with the sliding gear in the construction of FIGS. 1C and 2.

Partichlar description of the invention

In FIG. 1 the hydrokinetic torque converter of the driveline is shown at 10. It includes an impeller 12 having an outer shroud 14, which is journaled by means of a bushing 16 on a stationery sleeve shaft 18. The shaft forms a part of the transmission housing indicated generally by reference character 20.

In fluid flow relationship with respect to the impeller 12 is a bladed turbine 22 having an outer shroud 24 connected to a turbine hub 26. The hub is journaled by bushing 28 within a pilot opening 30 formed in the right-hand end of an engine crankshaft shown in part at 32.

A transmission power input shaft 34 is journaled by bushing 36 within a pilot opening formed in the crankshaft 32. An overrunning clutch 38 establishes a one-way driving connection between hub 26 and the shaft 34. Torque delivery is possible between the turbine 22 and the shaft 34 in one direction, although the shaft 34 will freewheel with respect to the turbine to permit overspeeding of the shaft 34 in the direction of rotation of the turbine.

A bladed stator 40 is situated between the toroidal fluid flow exit section of the turbine 22 and the toroidal fluid entrance section of the impeller 12. The bladed stator 40 includes a hub 42 which is mounted for rotation upon the support sleeve shaft 18. An overrunning brake 44 establishes a one-way braking action between the stator 40 and the shaft 18. The stator 40 can freewheel in the direction of rotation of the impeller, but relative motion of the stator 40 in the opposite direction is inhibited by the brake 44.

The housing 20 includes a support sleeve 46. The right-hand end of the power input shaft 34 is journaled within the sleeve 46 with a bearing assembly 48. Power input gear 50 is connected directly to the power input shaft 34.

The shaft 34 is formed with a central, internal opening 52 within which is positioned a spring lever 54. The lever is pivoted at its center on a pin 56 situated transversely with respect to the axis of the shaft 34. It is carried in an opening in the shaft 34 and the lever 54 may be provided with an eyelet through which the pin 56 is received.

One end 58 of the lever 54 is adapted to engage a plunger 60 slidably situated within a radial opening 62 formed in the shaft 34. The outer end of the plunger 60 engages one end 64 of a coil spring 66. The spring encircles the shaft 34 situated within the hub 26.

The right-hand end of the multiple coil spring clutch element 66 is turned radially inwardly and is received within an opening 68 formed in the shaft 34. The left-hand end of the multiple coil spring element 66, as viewed in FIGURE 1, is free within the annular space defined by the inner surface of the hub 26 and the outer surface of the power input shaft 34. The plunger 60 is situated radially inward of the free end at the left-hand side of the multiple coil spring element 66.

Normally, a clearance exists between the outer surface of the coils of the multiple coil spring element 66 and the inner surface of the hub 26. If the plunger 60 is moved radially outwardly, however, the end of the coil element 66 is moved outwardly thereby causing the outer surface of the coils to engage frictionally the inner cylindrical surface of the hub 26. The frictional force created on the first turn of the multiple coil clutch element 66 will tend to cause the other coils to expand thereby frictionally locking the element 66 to the inner surface of the hub 26. The element 66 acts in this fashion as an overrunning clutch element that will prevent rotation of the hub 26 in one direction with respect to the shaft 34 but will accommodate freewheeling motion in the other direction. The direction in which locking engagement of the element 66 occurs is opposite to the direction in which engagement of the overrunning clutch 38 occurs. Thus the clutch 38 can accommodate torque delivery from hub 26 to the shaft 34, and the element 66 can accommodate torque delivery in the opposite direction from the shaft 34 to the hub 26.

The right-hand end 70 of the lever 54 is situated directly adjacent a pair of clutch engaging plungers or control buttons as indicated at 72 and 74. These buttons are mounted for radial movement in radial openings 76 and 78, respectively, formed in the shaft 34. The radially inward ends of the buttons 72 and 74 engage the end 70 of the lever 54. The end 70 is formed with a conical terminal portion 80, which is engaged by a detent plunger 82 having a crown 84. The plunger 82 is urged in a left-hand direction by a detent spring 86, which is anchored on an internal snap ring seat 88 carried by shaft 34. When the end 70 is moved upwardly as viewed in FIGURE 1, the detent plunger 82 tends to maintain it in the upward position. At this time the button 74 is positioned at a radially outward location. The end 70 is caused to assume this position as button 72 is depressed radially inwardly.

Movement of the end 70 in the opposite direction is accomplished as the button 74 is depressed radially inwardly. Button 72 at this time moves radially outwardly. The detent plunger 82 again maintains the end 70 in the downward position as viewed in FIGURE 1 under these latter conditions.

Movement of the end 70 is accompanied by movement of the end 58 into and out of engagement with the plunger 60. As the button 74 is depressed, the plunger 60 is moved radially outwardly thereby causing the multiple coil spring clutch element 66 to engage frictionally the hub 26. Movement of the button 72 radially inwardly, on the other hand, will cause the clutch element 66 to disengage.

Movement of the buttons 72 and 74 is accomplished by blades 90 and 92. These are formed with an elongated cross section and are situated slidably within the elongated slots 94 and 96, respectively. The radially inward ends of the blades 90 and 92 can be cammed so that they are adapted to engage and to depress the ends of the buttons 72 and 74 upon rotation of the shaft 34.

Depression of button 74 is accomplished by manually depressing the blade 90 until its cammed inner end rides over the end of the button 74. The cammed inner end of button 94 acts in a similar fashion as it is depressed manually. A suitable mechanical linkage mechanism, not shown, permits the blades 90 and 92 to be depressed selectively by the vehicle operator from a remote location in the vehicle passenger compartment.

Power input gear 50 engages drivably countershaft gear 98, which is connected directly to a transmission countershaft 100. This is journaled by spaced bushings 102 and 104 formed in openings in the transmission housing. The transmission power output shaft 106 is located in alignment with the end shaft 34. A low speed-ratio power output gear 108 is journaled rotatably about the axis of the shaft 106. A sliding gear 110 is mounted on shaft 106 by means of a splined connection that will permit axial movement of the gear 110 in the direction of the axis of the shaft 106. Gear 110 is adapted to be engaged by a reverse drive pinion shown by means of phantom lines at 112. When the gear 110 assumes the neutral position shown in FIGURE 3 and when the reverse drive pinion 112 is shifted in a left-hand direction, pinion 112 engages also the gear 114 (see FIGURE 1C) which is splined to the countershaft 100.

When the sliding gear 110 is shifted in a right-hand direction, clutching engagement with the gear 108 is possible. A synchronizer clutch arrangement shown schematically at 116 establishes this driving connection. The engaging teeth of the synchronizer assembly are shown in FIGURES 4A and 4B, the teeth 118 being carried by the gear 110 and the companion teeth 120 being carried by the gear 108.

When the sliding gear 110 is shifted in a left-hand direction, the second synchronizer clutch structure shown schematically at 122 establishes a driving connection between gear 110 and power input gear 50. As a result of this, the power input shaft 34 becomes coupled directly to the power output shaft 106.

Reverse drive is obtained by shifting the gear 110 to the neutral position and by shifting the reverse drive pinion 112 in a left-hand direction.

Ratio shifts from low speed-ratio drive to the direct driving ratio are accomplished in the manner described in Patent No. 3,161,015. If it is desired to shift from a neutral position to the low speed position, gear 110 must be shifted while a slight amount of turbine torque is applied to the turbine 22. This is due to the fact that the torque converter impeller 12 is connected directly at all times to the crankshaft. A slight amount of torque thus is delivered to the turbine 22 even under engine idling conditions. Notwithstanding the presence of this turbine torque, it is possible to shift the gear 110 into engagement with gear 108. At this time the teeth are misaligned as indicated by means of full lines in FIGURE 4A. If the gear 110 is shifted with a slight amount of shifting effort to the right-hand positoin, the gear 108 will be rotated slightly to permit alignment of the teeth 118 with cooperating spaces between the clutch teeth 120, as shown in FIGURE 4B. A slight angular adjustment of the gear 108 will be accompanied by a corresponding adjustment of the gear 114. This is permitted by the lost motion connection at the spline 124 for the gear 114. This spline connection is indicated best in FIGURE 3.

Spline teeth 126 of the gear 114 are spaced so that the gap between the teeth is wider than the tooth width of the external teeth 128 carried by the shaft 100. A coil spring 130 having one end anchored to the shaft 100 and the other end anchored to the gear 114, as indicated in FIGURE 2, biases the gear 114 in one direction. The biasing force of the spring, however, can be overcome to permit the shifting of the gear 108 as a clutching action when the gear 110 is established.

During operation in the overdrive range, coast braking can be obtained regardless of which speed ratio is assumed by the gearing. This is done simply by actuating the blade 90 to establish a locking action between the hub 26 and the shaft 34 through the clutch element 66. Coast braking is interrupted when the blade 92 is actuated.

A countershaft brake drum 132 is splined to the shaft 100. The drum 132 is surrounded by selectively engageable brake band 132 of reduced capacity. Its capacity is sufficient to overcome the residual turbine torque that is the gear system during engine idling. The synchronizer teeth of FIGURES 4A and 4B can be engaged in the manner described after the shaft 100 is held stationary by the brake 134. The backlash between the gear 114 and the shaft 100 will permit this to take place as above explained.

Having thus described a preferred form of my invention, what I claim and desire to secure by U.S. Letters Patent is:

1. A power transmission mechanism comprising a driving shaft, a driven shaft, a hydrokinetic unit comprising a bladed impeller and a bladed turbine situated in toroidal fluid flow relationship, a power output shaft, gearing connecting said driven shaft and said power output shaft, said driven shaft being hollow and extending coaxially with respect to said hydrokinetic unit, the turbine including a turbine hub surrounding said shaft, an overrunning coupling connection between said hub and said shaft for distributiong torque from said turbine to said shaft while accommodating freewheeling motion of said shaft with respect to said turbine in the direction of motion of said turbine, a second overrunning coupling between said hub and said driven shaft comprising a multiple coil clutch element encircling said driven member, one peripheral surface of said clutch element being disposed adjacent the surface of said hub and frictionally engageable therewith, one end of said coil clutch element being anchored to said driven shaft, a radially movable trigger carried by said driven shaft engageable with the other end of said clutch element when it is moved radially whereby said clutch element frictionally engages said clutch hub to establish a one-way driving connection between said driven shaft and said hub which will permit torque delivery from said driven shaft to said hub while accommodating freewheeling motion of said turbine with respect to said driven shaft when torque is delivered from said turbine to said driven shaft, a clutch lever in said driven shaft including one portion engageable with said trigger upon movement thereof, and a manually operable clutch controlling element carried by said driven shaft and movable radially into engagement with said lever to adjust the same into and out of a clutch element locking position.

2. The combination as set forth in claim 1 wherein said lever comprises a central pivot means for pivotally mounting said lever on said driven shaft, an over-center detent means for applying a force on said lever to urge it either into a clutch engaging position or into a clutch release position depending upon the direction of adjustment of said lever.

3. The combination as set forth in claim 1 wherein said manually operable clutch controlling element comprises two movable cam actuating buttons carried by said driven member, one button being situated 180° out of position with respect to the other, each button being engageable with one end of said lever to urge the latter into either of two operating positions to effect clutch release or clutch engagement.

4. The combination as set forth in claim 3 wherein said manually operable clutch controlling element comprises a pair of blades mounted in a relatively stationary portion of said mechanism and movable radially toward and away from said driven member, and cam surfaces formed on said blades engageable with said buttons.

5. The combination as set forth in claim 1 wherein said gearing comprises a power input gear connected to said driven member, a first countershaft gear engageable with said power input gear, a countershaft connected to said countershaft gear, a power output gear encircling said power output shaft, means for braking said countershaft selectively during ratio changes, a positive drive clutch comprising a clutch element slidably connected to said power output shaft and carrying thereon first clutch teeth, second clutch teeth carried by said driven shaft engageable with said first clutch teeth, a second countershaft gear carried by said countershaft and engageable with said power output gear, and a lost motion connection between said second countershaft gear and said countershaft which is adapted to permit a limited degree of angular relative motion of said second countershaft gear with respect to said countershaft during engagement of said clutch teeth.

6. The combination as set forth in claim 5 wherein said lost motion connection comprises spring means for normally urging said second countershaft gear in one angular direction with respect to said countershaft, said spring yielding as said clutch teeth are shifted into engagement with each other when they are axially misaligned, said brake means being adapted to hold said countershaft stationary.

References Cited

UNITED STATES PATENTS

| | | | |
|---|---|---|---|
| 1,576,996 | 3/1926 | Rabcliffe | 192—3.21 |
| 2,726,513 | 12/1955 | McWethy et al. | 192—3.21 X |
| 2,789,448 | 4/1957 | Lapsley | 74—732 |
| 3,367,461 | 2/1968 | Nagel | 192—35 |

ARTHUR T. McKEON, *Primary Examiner.*

U.S. Cl. X.R.

192—3.21